United States Patent
Geil

(10) Patent No.: US 9,705,932 B1
(45) Date of Patent: Jul. 11, 2017

(54) METHODS AND SYSTEMS FOR CREATING, DE-DUPLICATING, AND ACCESSING DATA USING AN OBJECT STORAGE SYSTEM

(71) Applicant: BitSight Technologies, Inc., Cambridge, MA (US)

(72) Inventor: Ethan C. Geil, Cambridge, MA (US)

(73) Assignee: BitSight Technologies, Inc., Cambridge, MA (US)

( * ) Notice: Subject to any disclaimer, the term of this patent is extended or adjusted under 35 U.S.C. 154(b) by 0 days.

(21) Appl. No.: 15/377,574

(22) Filed: Dec. 13, 2016

(51) Int. Cl.
*H04L 29/06* (2006.01)
*G06F 17/30* (2006.01)

(52) U.S. Cl.
CPC ........ *H04L 63/20* (2013.01); *G06F 17/30371* (2013.01); *G06F 17/30377* (2013.01); *H04L 63/145* (2013.01); *H04L 63/1458* (2013.01)

(58) Field of Classification Search
CPC ... H04L 63/20; H04L 63/145; H04L 63/1458; G06F 17/30371; G06F 17/30377
USPC ............................................................. 726/23
See application file for complete search history.

(56) References Cited

U.S. PATENT DOCUMENTS

| | | | | |
|---|---|---|---|---|
| 9,384,206 B1 * | 7/2016 | Bono | ............... | G06F 17/30159 |
| 2007/0198275 A1 * | 8/2007 | Malden | ............... | G06Q 10/10 |
| | | | | 705/1.1 |
| 2010/0042605 A1 * | 2/2010 | Cheng | ............... | G06F 17/30309 |
| | | | | 707/695 |
| 2011/0145576 A1 * | 6/2011 | Bettan | ............... | H04L 63/0435 |
| | | | | 713/168 |

* cited by examiner

*Primary Examiner* — Michael S McNally
(74) *Attorney, Agent, or Firm* — Goodwin Procter LLP

(57) ABSTRACT

The invention relates to object storage and methods systems for storing data objects that overcome the pitfalls of using traditional object storage systems. Advantages include an easily searchable database and multiversion concurrency control meaning one version of the database may be read from and written to at the same time.

28 Claims, 4 Drawing Sheets

METHODS AND SYSTEMS FOR CREATING, DE-DUPLICATING, AND ACCESSING DATA USING AN OBJECT STORAGE SYSTEM

TECHNICAL FIELD OF THE INVENTION

The invention relates generally to object storage and methods systems for storing data objects.

BACKGROUND

An object storage system (e.g. Amazon's S3) allows large volumes of data to be stored efficiently across a distributed system, at relatively low cost and with high reliability. However, when compared to file-based storage systems, object storage systems typically suffer from several limitations.

In object storage systems, objects are immutable, meaning once an object is created, the data in it cannot be changed or appended to. A new object can be associated with a given key (effectively updating the original object), but this typically requires retransmitting the entire object. However, object updates are atomic—meaning either the entire update succeeds or the entire update fails.

Object stores are typically eventually (rather than strongly) consistent. That is, if a key is associated with a new object (or is deleted), the change may not be visible to consumers for some period of time; furthermore, the particular version of an object a consumer receives for a given key is indeterminate.

Additionally in current object storage systems there is no central list of objects in the storage system (at least not one that is exposed to users), so listing, searching, or counting objects are all expensive operations.

There is a current need to overcome these limitations to create an object storage system that allows users to have increased visibility into the data being stored in the system and how the transactions are processed.

SUMMARY OF THE INVENTION

The security risk management that we describe here may encompass one or more of the following (and other) aspects, features, and implementations, and combinations of them. In general, in an aspect, a method is provided for updating data stored in a database that includes receiving from a first device over a network records including data consisting of externally observable evidence of cybersecurity incidents and observations of an entity's cybersecurity posture from a first device over a network and assigning each record a de-duplication key. The de-duplication key is used to order the records and identify duplicate records, thus creating within the database a data object to store the records and inserting the records into the data object as a batch insertion, wherein the batch insertion creates a new version of the database thereby maintaining multiple independent versions of the database.

In some embodiments, the first device includes a computer or mobile device. In some embodiments, observable evidence of cybersecurity incidents is based at least in part on botnet infections and DNS attacks and the entity's cybersecurity posture is based at least in part on SSL certificates found on the entity's servers and open ports on machines within the entity's IP footprint.

In some embodiments, the de-duplication key may include a key ID and a timestamp. The key ID may include a combination of a botnet infection type and a unique tracking ID. The timestamp may include a timespan associated with a twenty-four hour period during which a cyber-security incident occurred. In some embodiments, the de-duplication key is used to order the one or more records in order from newest to oldest. Identifying duplicate records may include combining and/or deleting duplicate records.

In some embodiments, each record is stored within the data object in a compressed, column-oriented format. In some embodiments, the method further includes sorting the records stored within the data object by a tuple using, for example, a combination of the de-duplication key and a record date.

In some embodiments, the method further includes creating partitions containing data objects, and in some implementations further includes creating pages, each containing one data object. In some embodiments, the data object may be designated as closed—thus prohibiting the insertion of new records.

In another aspect, a system is provided for updating data stored in a database. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory, or both.

The instructions program the processing unit to receive, from a first device over a network, data consisting of externally observable evidence of cybersecurity incidents and observations of an entity's cybersecurity posture and to assign each record a de-duplication key. The de-duplication key orders the records, identifies duplicate records and creates a data object to store the one or more records within the database. The instructions further implement inserting the records into the data object as a batch insertion, wherein the batch insertion creates a new version of the database thereby maintaining multiple independent versions of the database.

In some embodiments of the system, the first device includes a computer or mobile device. In some embodiments of the system, observable evidence of cybersecurity incidents is based at least in part on botnet infections and DNS attacks, and the entity's cybersecurity posture is based at least in part SSL certificates found on the entity's servers and open ports on machines within the entity's IP footprint.

In some embodiments of the system, the de-duplication key includes a key ID and a timestamp. The key ID may include a combination of a botnet infection type, a unique tracking ID, and one or more source IDs, where a source ID may be an IP address, domain name, or other identifier. The timestamp may include a timespan associated with a twenty-four hour period during which a cyber-security incident occurred. In some embodiments of the system, the de-duplication key is used to order the records in order by date. Resolving duplicate records may include combining and/or deleting duplicate records.

In some embodiments, each record is stored within the data object in a compressed, column-oriented format. In some embodiments, the instructions further include programming the processing unit to sort the records stored within the data object by a tuple, which may include a combination of the de-duplication key and a record date.

In some embodiments of the system, the instructions may further include programming the processing unit to create partitions containing data objects. The instructions may further program the processing unit to instruct the system to create pages, each containing one data object. In some embodiments, the instructions further program the processing unit to designate the data object as closed, thus prohibiting insertion of new records.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Embodiments of the invention provides methods and supporting systems that implement a specialized database that is backed by an object storage system, rather than a traditional file system. The unique characteristics of object storage systems require several novel techniques in the database's implementation to overcome the previously described limitations of current object storage systems. In a preferred embodiment, the object storage system may be used to store records containing data including externally observable evidence of cybersecurity incidents and observations of an entity's cybersecurity posture. When references are made herein to an "entity" or "entities" it is meant broadly to include, for example, individuals or businesses that communicate electronically with other individuals or businesses and potentially share electronic data.

Figure 1:
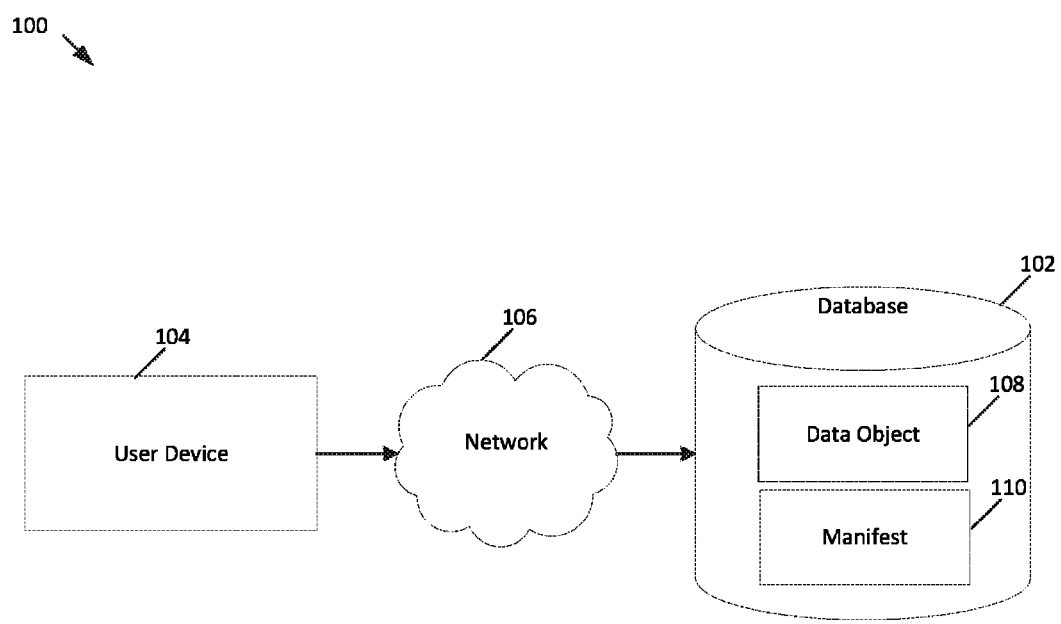
FIG. 1 is a block diagram of an example environment for storing object in an object storage database in accordance with various embodiments of the invention.

FIG. 1 shows a block diagram of an embodiment of the object storage system 100. A database 102 receives one or more records from a device 104, via a network 106. The records may contain data pertaining to externally observable evidence of compromise, or records of cybersecurity incidents; e.g. botnet infections. The records may additionally contain diligence data, which includes observations of various aspects of an entity's cybersecurity posture, for example, SSL certificates found on their servers, or open ports seen on machines within the entity's IP footprint.

When new records are received they are assigned a de-duplication key. The de-duplication key may be based on fields within each record and varies between record types. In some embodiments, the de-duplication key includes a timestamp and a key ID. The key ID may include a combination of a botnet infection type, a unique tracking ID, and one or more source IDs, where a source ID is an IP address, domain name, or other identifier. The source ID identifies the source of the event, for example, the address of a machine, a domain name, the name and date of an SEC 10-k filing, among others. De-duplication keys are chosen to reduce the volume of data stored, while retaining a sufficient amount of information about what makes a record unique. For example, a record storing information of a botnet infection may have a de-duplication key that is a combination of the infection type and a unique tracking ID assigned to that particular instance of the botnet. A single botnet instance typically contacts a sinkhole many times per day (with little variation in the content of the message), so these events may be combined into a single record with a count. In some embodiments, the de-duplication keys are chosen to satisfy some particular business logic requirement.

Records are stored in ordered pages, with each page corresponding to a single object 108. Records are sorted within each object 108 by the tuple, which is a combination of the record date and the de-duplication key. Each object 108 is individually sorted, making it easy to read records from the multiple objects that make up a partition in globally sorted order. The ordering may be chosen so that new records tend to be inserted at the end of a partition, into smaller pages as it is less of a cost to frequently access these pages. For example, when sorting records by record date and de-duplication key, the record dates stored within each object may be chosen to balance the cost of accessing many small objects with the cost of inserting new records. Objects containing older record dates may be larger because it is less likely that these objects will need to be updated.

Once an object 108 is inserted into the database 102, the object 108 is immutable and may never be updated. An advantage of this is that the database 102 avoids potential errors due to eventual consistency. For example, when a read either succeeds and is consistent, or it fails because the object 108 being read does not exist.

Further, the database 102 may be versioned and each version is immutable. A versioned database has the advantage of multiversion concurrency control, meaning readers may consistently read from one version of the database while the database is being written to by another process. Multiple database versions also facilitate reversions to previous versions of the database if corruption occurs.

The database 102 may store an manifest 110 as a single meta-object. The manifest 110 contains a list of references to all objects in a particular version of the database 102 along with indices and other metadata to allow a user to access data in the object storage system efficiently. When new records are entered into the system 100, the data objects 108 are created first and then the manifest 110 may be written to the database 102 under a unique, version-containing key. The manifest 110 is atomic, and therefore if all the objects referenced by the manifest exist, then that version of the database 102 is complete and consistent.

Figure 2:
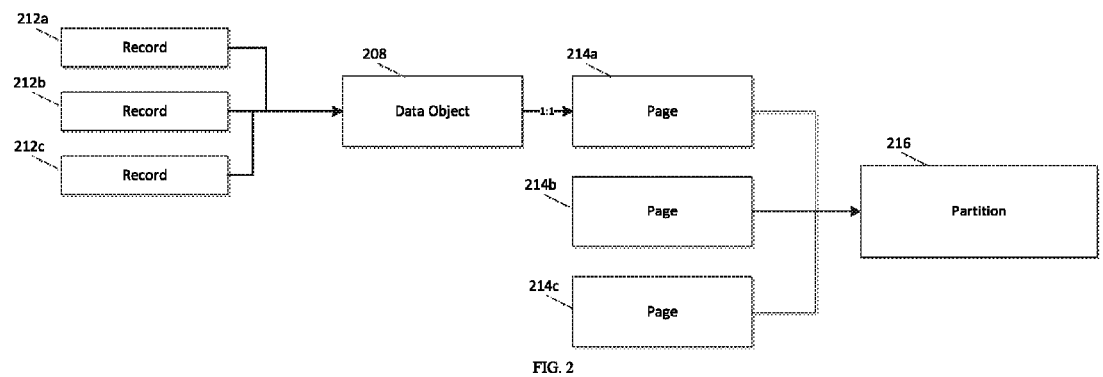
FIG. 2 is a block diagram of the relationship between records, data objects, pages, and partitions within the object storage system in accordance with various embodiments of the invention.

FIG. 2 shows a block diagram of the relationship between records 212a, 212b, 212c, data objects 208, pages 214a, 214b, 214c, and partitions 216 within the object storage system. For efficiency, many records 212a, 212b, 212c are packed into a single data object 208. Records are stored within each object in a compressed, column-oriented format (i.e., each field in the record corresponds to a column), which allows for efficiency when reading by allowing the user to filter by a particular column or to read only the columns of interest.

Each data object 208 in the object store is a page 214a, containing one or more records. Each page 214a contains only one data object 208 and multiple pages 214a, 214b, 214c are stored in each partition 216. Records are partitioned using a partition key that divides the data into subsets of roughly equal size. This allows the partitions to be operated upon in parallel by large numbers of independent processes and machines. Methods of balancing partitions include choosing fixed partitions; randomly sampling the input data;

splitting existing partitions that are too large; or using performance data from consumers of the database to adjust partition sizes and boundaries.

Figure 3:
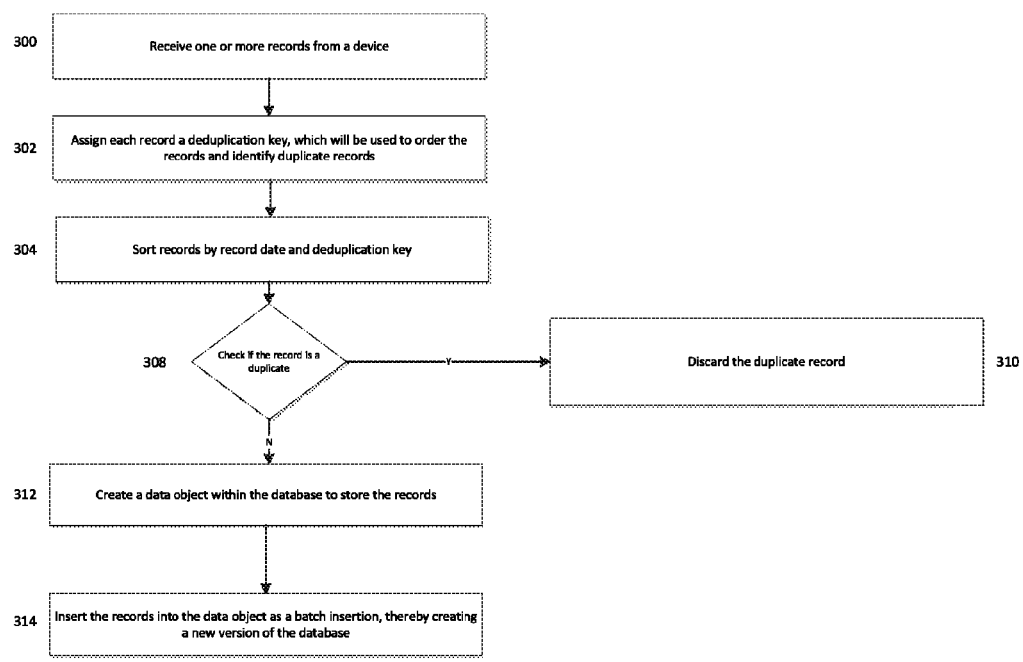
FIG. 3 is a flow chart of how the system receives and stores new records in accordance with various embodiments of the invention.

FIG. 3 is a flow chart describing new record insertion into the database. The database receives one or more new records from a device over a network (300). As previously described, the objects in the database are immutable and therefore when new records are inserted, new objects must be created.

Each record that is received is assigned a de-duplication key (302). As previously described the de-duplication key allows the records to be sorted by the tuple. Sorting the records allows duplicate records to be identified by the de-duplication key (306). Duplicate records may then be resolved and discarded or aggregated together (308, 310). In some embodiments, aggregating two records may involve (1) choosing the more relevant of the two and discarding the other, (2) incrementing an occurrence count in the combined record, (3) choosing a combination of fields from the two records in order to produce an aggregate record (e.g. concatenating a list from one record with a list from the other, or (4) some combination of the above.

As previously described new objects are created within the database to store the new records (312). The sorted and de-duplicated records are inserted into the database in a batch insertion. When the new objects have been written into the object store, a new manifest is created and written into the object store. The new manifest constitutes a new version of the database. (314). When the records are inserted, the database identifies the partitions and pages into which they fall, for example, based on each record's record date and source ID. The new records are merged into existing pages, which are written into the object storage system as new objects. Once records are inserted into the new objects they may be marked as closed for insertion. The process of merging records into existing pages may be executed using a distributed sort-merge-join algorithm that may be tuned, for example, to minimize the number of objects that are being read at any time.

When the merged pages have been written into the object storage system as new objects, a new manifest is created. This new manifest contains references to both updated pages and to pages that were unaffected by the insertion. When the new manifest is written into the object storage system, this creates a new version of the database.

In some embodiments, to maintain read performance, the database is periodically compacted. As previously described, pages near the end of a partition may be small to allow for efficient insertions as they are accessed frequently. However, over time the count of pages within a partition may grow, requiring reads to a larger number of objects. Therefore, small pages may be periodically merged into larger pages within a partition.

Figure 4:
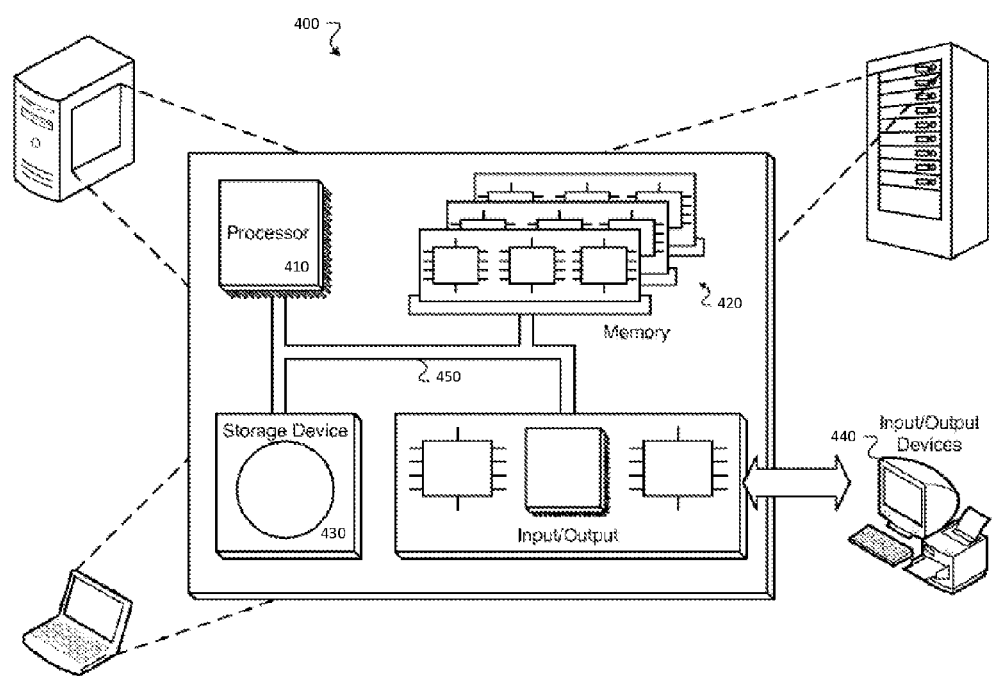
FIG. 4 is a block diagram of system for storing object in an object storage database in accordance with various embodiments of the invention.

FIG. 4 is a block diagram of an example computer system 400. For example, referring to FIG. 1, the object storage system or a server forming a portion of the object storage system could be an example of the system 400 described here, as could a computer system used by any of the users who access resources of the environment 100. The system 400 includes a processor 410, a memory 420, a storage device 430, and an input/output device 440. Each of the components 410, 620, 430, and 440 can be interconnected, for example, using a system bus 650. The processor 410 is capable of processing instructions for execution within the system 400. In some implementations, the processor 410 is a single-threaded processor. In some implementations, the processor 410 is a multi-threaded processor. In some implementations, the processor 610 is a quantum computer. The processor 410 is capable of processing instructions stored in the memory 420 or on the storage device 430. The processor 410 may execute operations such as the steps described above in reference to the process described in FIG. 3.

The memory 420 stores information within the system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a solid-date drive, a flash drive, magnetic tape, or some other large capacity storage device. In some implementations, the storage device 430 may be a cloud storage device, e.g., a logical storage device including multiple physical storage devices distributed on a network and accessed using a network. In some examples, the storage device may store cyber-security data, which are stored in records in the data objects 108 in the database 102 (FIG. 1). The input/output device 440 provides input/output operations for the system 400. In some implementations, the input/output device 440 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. A network interface device allows the system 400 to communicate, for example, transmit and receive data such as data from the user device 104 shown in FIG. 1. In some implementations, the input/output device can include driver devices configured to receive input data and send output data to other input/output devices, e.g., keyboard, printer and display devices. In some implementations, mobile computing devices, mobile communication devices, and other devices can be used.

A server (e.g., a server forming a portion of the object storage system) can be realized by instructions that upon execution cause one or more processing devices to carry out the processes and functions described above, for example, creating partitions, merging pages, and compressing partitions. Such instructions can include, for example, interpreted instructions such as script instructions, or executable code, or other instructions stored in a computer readable medium. A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 4, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as software for mapping data to entities and assigning security ratings and confidence scores to entities (FIGS. 1-4), can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of the server 102) is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

The terms and expressions employed herein are used as terms and expressions of description and not of limitation and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A method for updating data stored in a database comprising:
    receiving, from a first device over a network, one or more records comprising data consisting of externally observable evidence of cybersecurity incidents and observations of an entity's cybersecurity posture;
    assigning each record a de-duplication key comprising a key ID and a timestamp, wherein the de-duplication key is used to (i) order the one or more records and (ii) identify duplicate records;
    creating within the database a data object to store the one or more records;
    inserting the one or more records into the one or more new data objects as a batch insertion, wherein the batch insertion creates a new version of the database thereby maintaining multiple independent versions of the database.

2. The method of claim 1 wherein the first device comprises a computer or mobile device.

3. The method of claim 1 wherein observable evidence of cybersecurity incidents is based at least in part on one or more of botnet infections and DNS attacks.

4. The method of claim 1 wherein the entity's cybersecurity posture is based at least in part on one or more of SSL certificates found on the entity's servers and open ports on machines within the entity's IP footprint.

5. The method of claim 1 wherein the key ID comprises a combination of a botnet infection type and a unique tracking ID and one or more source IDs, each source ID comprising an IP address or domain name.

6. The method of claim 1 wherein the timestamp comprises a timespan associated with a twenty-four hour period during which a cyber-security incident occurred.

7. The method of claim 1 wherein the de-duplication key is used to order the one or more records in date order.

8. The method of claim 1 wherein identifying duplicate records comprises one or both of combining and deleting duplicate records.

9. The method of claim 1 wherein each record is stored within the data object in a compressed, column-oriented format.

10. The method of claim 1 further comprising sorting the records stored within the data object by a tuple.

11. The method of claim 10 wherein the tuple comprises a combination of the de-duplication key and a record date.

12. The method of claim 1 further comprising creating one or more partitions wherein the one or more partitions contain one or more data objects.

13. The method of claim 12 further comprising creating one or more pages wherein the one or more pages contain one data object each.

14. The method of claim 1 further comprising designating the data object as closed for insertion of new records.

15. A system for updating data stored in a database, the system comprising:
a first processor; and a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
receive, from a first device over a network, one or more records comprising data consisting of externally observable evidence of cybersecurity incidents and observations of an entity's cybersecurity posture;
assign each record a de-duplication key comprising a key ID and a timestamp, wherein the de-duplication key is used to (i) order the one or more records and (ii) identify duplicate records;
create within the database a data object to store the one or more records;
insert the one or more records into the data object as a batch insertion, wherein the batch insertion creates a new version of the database thereby maintaining multiple independent versions of the database.

16. The system of claim 15 wherein the first device comprises a computer or mobile device.

17. The system of claim 15 wherein observable evidence of cybersecurity incidents is based at least in part on one or more of botnet infections and DNS attacks.

18. The system of claim 15 wherein the entity's cybersecurity posture is based at least in part on one or more of SSL certificates found on the entity's servers and open ports on machines within the entity's IP footprint.

19. The system of claim 15 wherein the key ID comprises a combination of a botnet infection type and a unique tracking ID.

20. The system of claim 15 wherein the timestamp comprises a timespan associated with a twenty-four hour period during which a cyber-security incident occurred.

21. The system of claim 15 wherein the de-duplication key is used to order the one or more records in order by date.

22. The system of claim 15 wherein identifying duplicate records comprises one or both of combining and deleting duplicate records.

23. The system of claim 15 wherein each record is stored within the data object in a compressed, column-oriented format.

24. The system of claim 15 wherein the instructions further comprise programming the processing unit to sort the records stored within the data object by a tuple.

25. The system of claim 24 wherein the tuple comprises a combination of the de-duplication key and a record date.

26. The system of claim 15 wherein the instructions further comprise programming the processing unit to create one or more partitions wherein the one or more partitions contain one or more data objects.

27. The system of claim 26 wherein the instructions further comprise programming the processing unit to create one or more pages wherein the one or more pages contain one data object each.

28. The system of claim 15 wherein the instructions further comprise programming the processing unit to designate the data object as closed for insertion of new records.

* * * * *